(12) United States Patent
Arar

(10) Patent No.: US 8,322,223 B2
(45) Date of Patent: Dec. 4, 2012

(54) AXIAL VIBRATION MONITORING FOR DETECTING SHAFT MISALIGNMENTS IN TURBOMACHINARY TRAINS

(75) Inventor: Malath Ibrahim Arar, Clifton Park, NY (US)

(73) Assignee: General Electric Company, Schenectady, NY (US)

( * ) Notice: Subject to any disclaimer, the term of this patent is extended or adjusted under 35 U.S.C. 154(b) by 260 days.

(21) Appl. No.: 12/765,974

(22) Filed: Apr. 23, 2010

(65) Prior Publication Data

US 2011/0259103 A1 Oct. 27, 2011

(51) Int. Cl.
*G01M 13/02* (2006.01)
*G01M 15/14* (2006.01)
*G01M 13/00* (2006.01)
*G01M 15/12* (2006.01)

(52) U.S. Cl. .......................... 73/660; 73/659
(58) Field of Classification Search .......... 73/579, 73/659, 660
See application file for complete search history.

(56) References Cited

U.S. PATENT DOCUMENTS

| | | | |
|---|---|---|---|
| 5,194,920 A | 3/1993 | Mattila | |
| 5,365,787 A | 11/1994 | Hernandez et al. | |
| 5,544,073 A * | 8/1996 | Piety et al. | 700/279 |
| 6,092,029 A | 7/2000 | Bently | |
| 6,289,735 B1 * | 9/2001 | Dister et al. | 73/579 |
| 6,768,938 B2 | 7/2004 | McBrien et al. | |
| 7,133,801 B2 * | 11/2006 | Song | 702/145 |
| 2005/0065712 A1 | 3/2005 | Skilton | |
| 2007/0073521 A1 * | 3/2007 | Carle et al. | 702/188 |
| 2009/0055129 A1 | 2/2009 | Altieri et al. | |
| 2009/0263247 A1 | 10/2009 | Mollmann | |
| 2010/0145639 A1 * | 6/2010 | Fu et al. | 702/56 |

OTHER PUBLICATIONS

European Search Report and Opinion dated Jul. 29, 2011 issued in connection with corresponding EP Application No. 11163290.7.

* cited by examiner

*Primary Examiner* — Peter Macchiarolo
*Assistant Examiner* — Rose M Miller
(74) *Attorney, Agent, or Firm* — Hoffman Warnick LLC; Ernest G. Cusick

(57) ABSTRACT

A system for determining a shaft misalignment in a turbomachinary train having a plurality of components with serially coupled rotating shafts. A disclosed system includes a sensor affixed to a component of the turbomachinary train proximate a rotating shaft, wherein the sensor collects vibration data along an axial direction of the rotating shaft. Also provided is a frequency analyzer for generating frequency domain data from the vibration data and an analysis system for analyzing a frequency component of the frequency domain data at one times a rotational frequency of the rotating shaft to identify a misalignment between the rotating shaft and an adjacently coupled rotating shaft.

20 Claims, 2 Drawing Sheets

AXIAL VIBRATION MONITORING FOR DETECTING SHAFT MISALIGNMENTS IN TURBOMACHINARY TRAINS

BACKGROUND OF THE INVENTION

The subject matter disclosed herein relates to the art of measuring and monitoring axial vibrations to identify misalignments in turbomachinary trains.

Turbomachinary trains comprise a set of components having serially coupled rotating shafts. A common example is a turbogenerator, which in its simplest form includes a turbine having a rotating shaft (i.e., a rotor) directly connected to a rotating shaft of an electric generator for the generation of electric power. More complex turbogenerator trains, such as those utilized in the power generation field, often comprise several large components having rotating shafts coupled in series. For example, a typical configuration may include a high pressure turbine having a rotating shaft that is coupled to a rotating shaft of a low pressure turbine, which is in turn coupled to a rotating shaft of a generator.

When implementing such a train, it is imperative that the rotating shafts from each component behave in a precise manner in order to avoid damage the rotors or bearings. For instance, one common problem in such a configuration involves an unbalanced shaft, in which one of the shafts "wobbles." This defect is commonly detected by measuring radial (i.e., outwardly directed) vibrations using e.g., piezoelectric probes. However, such vibrations may also result from misaligned shafts, which can also cause damage to the rotors or bearing.

BRIEF DESCRIPTION OF THE INVENTION

The disclosed embodiments describe solutions for identifying misaligned shafts coupled within a turbomachinary train.

A first aspect of the disclosure provides a system for determining a shaft misalignment in a train of components with serially coupled rotating shafts, comprising: a sensor affixed to a component of the train proximate a rotating shaft, wherein the sensor collects vibration data along an axial direction of the rotating shaft; a frequency analyzer for generating frequency domain data from the vibration data; and an analysis system for analyzing a frequency component of the frequency domain data at one times a rotational frequency of the rotating shaft to identify a misalignment between the rotating shaft and an adjacently coupled rotating shaft.

A second aspect of the disclosure provides a train, comprising: a plurality of components with serially coupled rotating shafts; a sensor affixed to at least one component proximate a rotating shaft, wherein the sensor collects vibration data along an axial direction of the rotating shaft; a frequency analyzer for generating frequency domain data from the vibration data; and an analysis system for analyzing a frequency component of the frequency domain data at one times a rotational frequency of the rotating shaft to identify a misalignment between the rotating shaft and an adjacently coupled rotating shaft.

A third aspect of the disclosure provides apparatus for determining a shaft misalignment in a train of components with serially coupled rotating shafts, comprising: a sensor affixed to a component of the train proximate a rotating shaft, wherein the sensor collects vibration data along an axial direction of the rotating shaft; a frequency analyzer for generating frequency domain data from the vibration data; and an analysis system for analyzing the frequency domain data to generate alignment information of the rotating shaft with respect to an adjacently coupled rotating shaft.

The illustrative aspects of the present disclosure are designed to solve the problems herein described and/or other problems not discussed.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure, in which.

It is noted that the drawings of the disclosure are not to scale. The drawings are intended to depict only typical aspects of the disclosure, and therefore should not be considered as limiting the scope of the disclosure. In the drawings, like numbering represents like elements between the drawings.

DETAILED DESCRIPTION OF THE INVENTION

Figure 1:
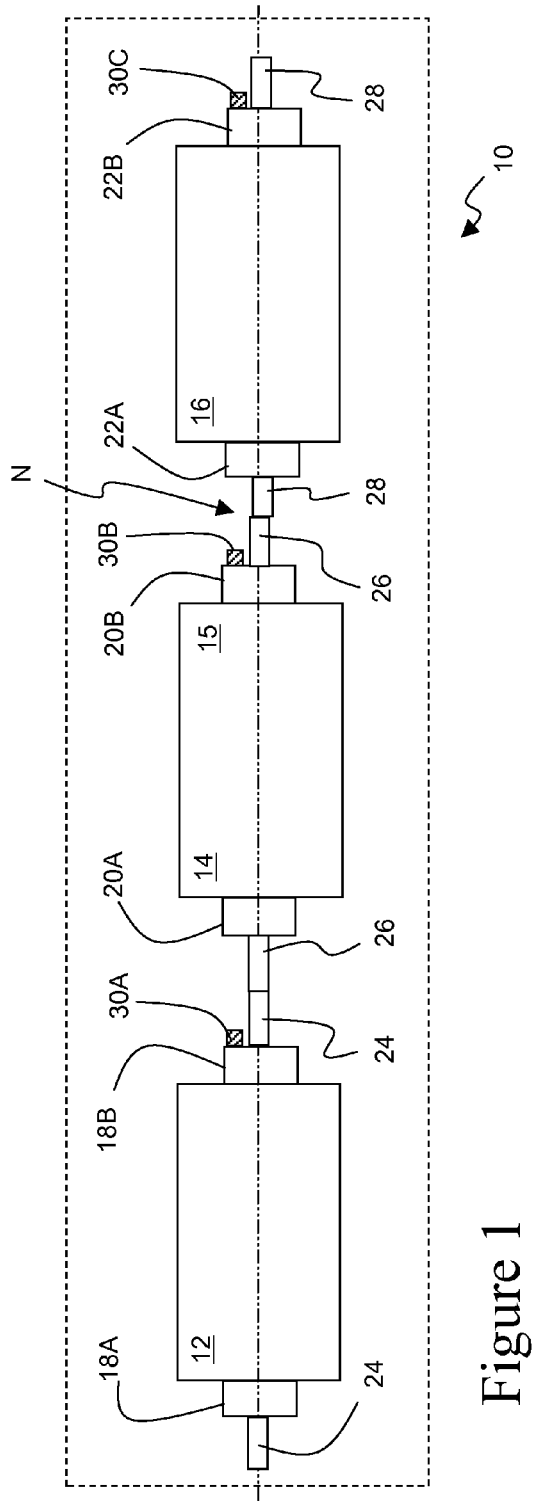
FIG. 1 depicts a turbomachinary train in accordance with an illustrative embodiment.

The disclosed embodiments describe solutions for identifying misaligned shafts coupled within a turbomachinary train. Referring to the drawings, FIG. 1 shows a turbomachinary train 10 that includes three components 12, 14 and 16, each having a respective rotating shaft 24, 26, 28 serially connected to an adjacent component. Components 12, 14 and 16 may comprise any type of machinery having rotating shafts serially coupled. For example, turbomachinary train 10 may include a turbogenerator in which component 12 is a high pressure turbine, component 14 is a low pressure turbine and component 16 is a generator. In another embodiment, the components may include a clutch and/or any other device with a rotating shaft. In addition, it is understood that turbomachinary train 10 may comprise any number or type of components, i.e., two or more, in which there is at least two shafts coupled together.

In addition to having a rotating shaft, each component 12, 14 and 16 may include a bearing housing 18A/18B, 20A/20B and 22A/22B, respectively. Bearing housings comprise bearings that hold the component's shaft in place and allow for the constrained relative rotational motion of the shaft with respect to the component.

In the example shown in FIG. 1 it can be seen that shaft 28 is misaligned with respect to shaft 26 at coupling N between bearing housings 20B and 22A. As noted, such misalignment can cause damage to the associated bearings and/or rotors. The defect can be particularly problematic in the case where one of the affected components is a clutch 15, which allows the coupling between shafts to be disengaged, and which tends to be highly sensitive to misalignment problems. Note that because the components 12, 14 and 16 are typically encased in a sealed unit (e.g., as shown by the dotted line), and the cost for correcting such defects are high, properly identifying shaft misalignments can provide a significant enhancement in any condition monitoring process.

To address this need, axial vibration sensors 30A, 30B and 30C are attached to a surface of at least one bearing housing 18B, 20B and 22B. In this example, one axial vibration sensor is located at each interface in which shafts of adjacent components are coupled. Note that any number or placement of sensors could be utilized, e.g., to provide redundancy. As detailed below, by analyzing axial vibrations of the bearing housing proximate the shaft, misalignment between two coupled shafts can be evaluated.

Figure 2:
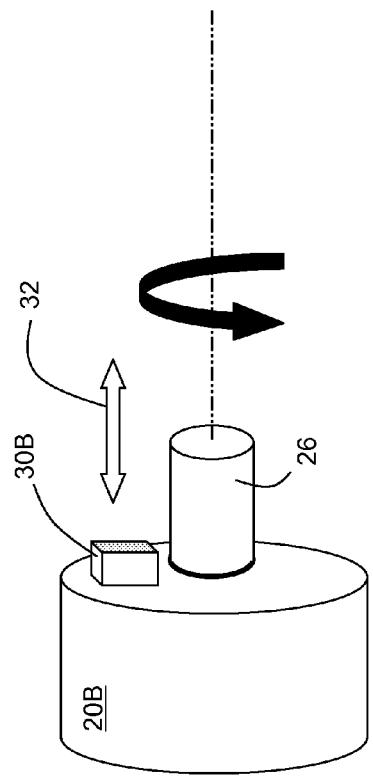
FIG. 2 depicts an isometric diagram showing a sensor on a bearing housing for measuring axial vibrations in accordance with an illustrative embodiment.

FIG. 2 depicts a close up view of bearing housing 20B, shaft 26 and axial vibration sensor 30B. As can be seen, axial vibration sensor 30B collects vibration data along the axial direction of the shaft 26, as shown by arrow 32. It is appreciated that the location, number and type of axial vibration sensors may vary depending on the particular implementation. In one illustrative embodiment, axial vibration sensor 30B utilizes a piezoelectric probe that is permanently mounted or affixed onto the housing 20B to receive a continuous flow of axial vibration data. In another embodiment, the axial vibration sensor 30B could be located somewhere other than housing 20B, e.g., on the foundation, integrated with a part of the component, etc.

Figure 3:
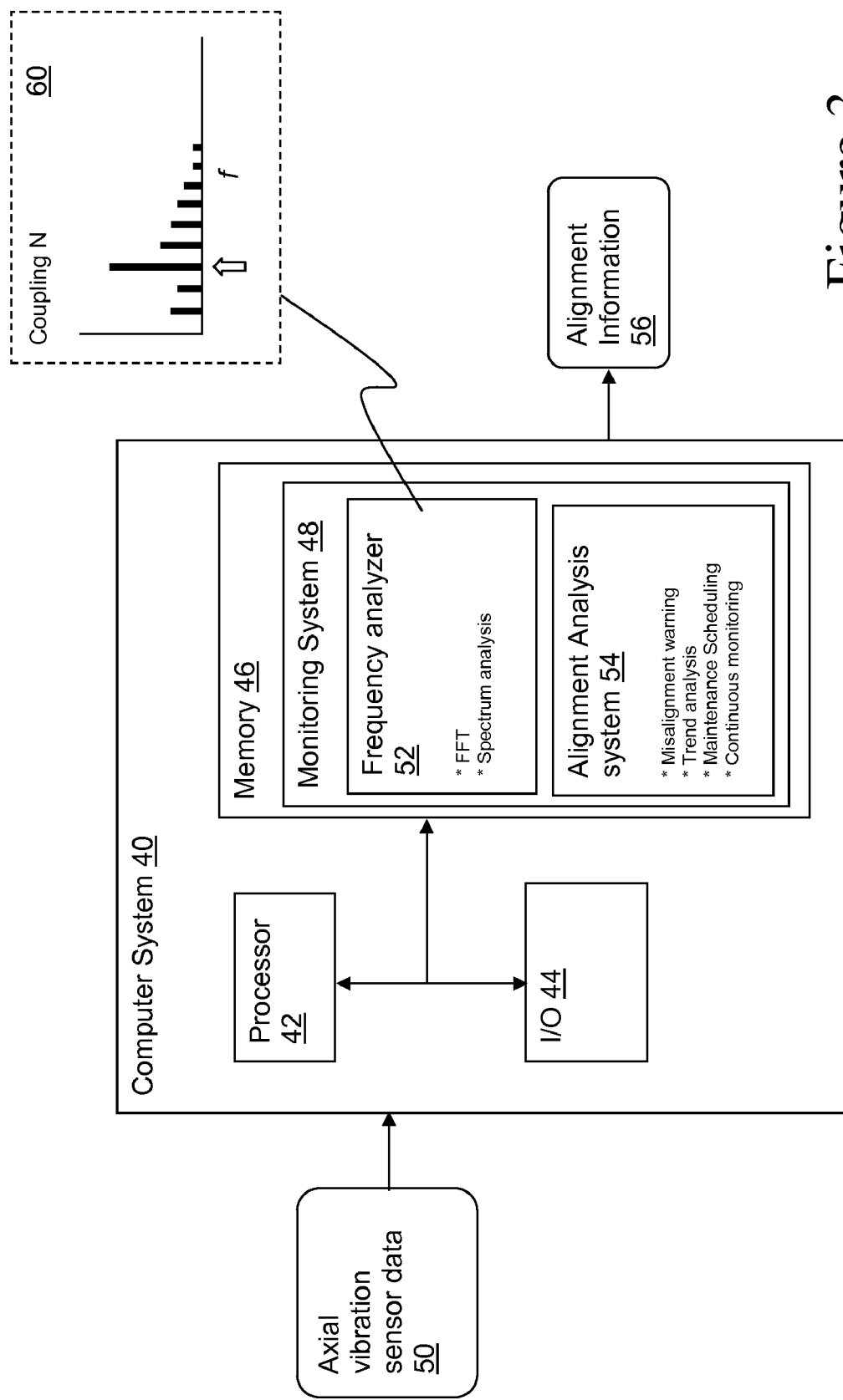
FIG. 3 depicts a computer system for processing axial vibration data in accordance with an illustrative embodiment.

FIG. 3 depicts a computer system 40 having a monitoring system 48 for processing axial vibration sensor data 50 and outputting alignment information 56. Axial vibration sensor data 50 may be collected from axial vibration sensors 30A, 30B and 30C (FIGS. 1-2) in any manner, e.g., wired or wirelessly, analog or digital, etc. Monitoring system 48, which receives the axial vibration sensor data 50 as continuous or periodic time domain data, generally includes: (1) a frequency analyzer 52 that converts the time domain axial vibration sensor data into frequency domain data; and (2) an alignment analysis system 54 that analyzes the frequency domain data to provide alignment information 56.

Frequency analyzer may utilize any technique to obtain frequency domain data, e.g., a Fourier transform, a fast Fourier transform (FFT), a spectral analysis such as a Cepstrum analysis, a Z transform, etc. Box 60 depicts an illustrative frequency analysis for coupling N (FIG. 1, shafts 26 and 28) in which the magnitudes of different frequency components are graphed out. In order to identify misalignments, the frequency component at one times (1×) the running frequency of the shaft is evaluated (shown here with the arrow) by alignment analysis system 54. Misalignments are identified if the frequency component at 1× the running frequency of the shaft contains the dominant vibration amplitude peak, which is the case in the example shown for coupling N.

In addition to identifying misalignments, alignment analysis system 54 may perform ancillary functions such as generating warnings, performing trend analysis to, e.g., predict future misalignments, providing maintenance scheduling for misaligned shafts, providing continuous real-time analysis, etc.

It is understood that computer system 40 may be implemented using any type of computing device. Such a computing device generally includes a processor 42, input/output (I/O 44), memory 46, and bus. The processor 42 may comprise a single processing unit, or be distributed across one or more processing units in one or more locations, e.g., on a client and server. Memory 46 may comprise any known type of data storage, including magnetic media, optical media, random access memory (RAM), read-only memory (ROM), a data cache, a data object, etc. Moreover, memory may reside at a single physical location, comprising one or more types of data storage, or be distributed across a plurality of physical systems in various forms.

I/O 44 may comprise any system for exchanging information to/from an external resource. External devices/resources may comprise any known type of external device, including sensors, a monitor/display, speakers, storage, another computer system, a hand-held device, keyboard, mouse, voice recognition system, speech output system, printer, facsimile, pager, etc. The bus provides a communication link between each of the components in the computing device and likewise may comprise any known type of transmission link, including electrical, optical, wireless, etc. Although not shown, additional components, such as cache memory, communication systems, system software, etc., may be incorporated.

Access may be provided over a network such as the Internet, a local area network (LAN), a wide area network (WAN), a virtual private network (VPN), etc. Communication could occur via a direct hardwired connection (e.g., serial port), or via an addressable connection that may utilize any combination of wireline and/or wireless transmission methods. Moreover, conventional network connectivity, such as Token Ring, Ethernet, WiFi or other conventional communications standards could be used. Still yet, connectivity could be provided by conventional TCP/IP sockets-based protocol.

It is understood that in addition to being implemented as a system and method, the features may be provided as one or more program products stored on a computer-readable storage medium, which when run, enables a computer system 40 to generate alignment information. To this extent, the computer-readable storage medium may include program code, which implements the processes and systems described herein. It is understood that the term "computer-readable storage medium" comprises one or more of any type of physical embodiment of the program code. In particular, the computer-readable storage medium can comprise program code embodied on one or more portable storage articles of manufacture (e.g., a compact disc, a magnetic disk, a tape, etc.), on one or more data storage portions of a computing device, such as memory and/or a storage system.

As used herein, it is understood that the terms "program code" and "computer program code" are synonymous and mean any expression, in any language, code or notation, of a set of instructions that cause a computing device having an information processing capability to perform a particular function either directly or after any combination of the following: (a) conversion to another language, code or notation; (b) reproduction in a different material form; and/or (c) decompression. To this extent, program code can be embodied as one or more types of program products, such as an application/software program, component software/a library of functions, an operating system, a basic I/O system/driver for a particular computing and/or I/O device, and the like. Further, it is understood that terms such as "component", "subsystem" and "system" are synonymous as used herein and represent any combination of hardware and/or software capable of performing some function(s).

The block diagrams in the figures illustrate the architecture, functionality, and operation of possible implementations of systems, methods and computer program products according to various embodiments of the present invention. In this regard, each block in the block diagrams may represent a module, segment, or portion of code, which comprises one or more executable instructions for implementing the specified logical function(s). It should also be noted that the functions noted in the blocks may occur out of the order noted in the figures. For example, two blocks shown in succession may, in fact, be run substantially concurrently, or the blocks may sometimes be run in the reverse order, depending upon the functionality involved. It will also be noted that each block of the block diagrams can be implemented by special purpose hardware-based systems which perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

What is claimed is:

1. A system for determining a shaft misalignment in a train of components with serially coupled rotating shafts, comprising:
    a sensor affixed to a component of the train proximate a rotating shaft, wherein the sensor collects vibration data along a longitudinal extent of the rotating shaft;
    a frequency analyzer for generating frequency domain data from the vibration data; and
    an analysis system for analyzing a frequency component of the frequency domain data at one times a rotational frequency of the rotating shaft to identify a misalignment between the rotating shaft and an adjacently coupled rotating shaft,
    wherein the train includes more than two components.

2. The system of claim 1, wherein the sensor is affixed to a bearing housing proximate the rotating shaft.

3. The system of claim 1, wherein a peak magnitude at about one times the rotational frequency of the rotating shaft indicates a misalignment.

4. The system of claim 1, wherein the component comprises a clutch that allows the rotating shaft to be disengaged from the adjacently coupled rotating shaft.

5. The system of claim 1, wherein the analysis system evaluates trends in the frequency domain data to predict a possible misalignment.

6. The system of claim 1, wherein the analysis system outputs alignment information in a continuous manner.

7. The system of claim 1, wherein the analysis system outputs a warning if a misalignment is detected.

8. The system of claim 1, wherein the frequency analyzer utilizes a calculation selected from a group consisting of: a Cepstrum analysis, and a Z transform.

9. The system of claim 1, further comprising a plurality of sensors for collecting axial vibration data from a plurality of locations in the train.

10. A train, comprising:
    three or more components with serially coupled rotating shafts;
    a sensor affixed to at least one component proximate a rotating shaft, wherein the sensor collects vibration data along a longitudinal extent of the rotating shaft;
    a frequency analyzer for generating frequency domain data from the vibration data; and
    an analysis system for analyzing a frequency component of the frequency domain data at one times a rotational frequency of the rotating shaft to identify a misalignment between the rotating shaft and an adjacently coupled rotating shaft.

11. The train of claim 10, wherein the sensor is affixed to a bearing housing proximate the rotating shaft.

12. The train of claim 10, wherein a peak magnitude at about one times the rotational frequency of the rotating shaft indicates a misalignment.

13. The train of claim 10, wherein the at least one component comprises a clutch that allows the rotating shaft to be disengaged from the adjacently coupled rotating shaft.

14. The train of claim 10, wherein the analysis system evaluates trends in the frequency domain data to predict a future misalignment.

15. The train of claim 10, wherein the analysis system outputs alignment information in a continuous manner.

16. The train of claim 10, wherein the analysis system outputs a warning if a misalignment is detected.

17. The train of claim 10, wherein the frequency analyzer utilizes a calculation selected from a group consisting of: a Cepstrum analysis, and a Z transform.

18. The train of claim 10, further comprising a plurality of sensors for collecting axial vibration data from a plurality of locations in the train.

19. An apparatus for determining a shaft misalignment in a train of components with serially coupled rotating shafts, comprising:
    a sensor affixed to a component of the train proximate a rotating shaft, wherein the sensor collects vibration data along a longitudinal extent of the rotating shaft;
    a frequency analyzer for generating frequency domain data from the vibration data; and
    an analysis system for analyzing the frequency domain data to generate alignment information of the rotating shaft with respect to an adjacently coupled rotating shaft,
    wherein the train includes more than two components.

20. The apparatus of claim 19, wherein the sensor is affixed to a bearing housing proximate the rotating shaft.

* * * * *